Figure 1:
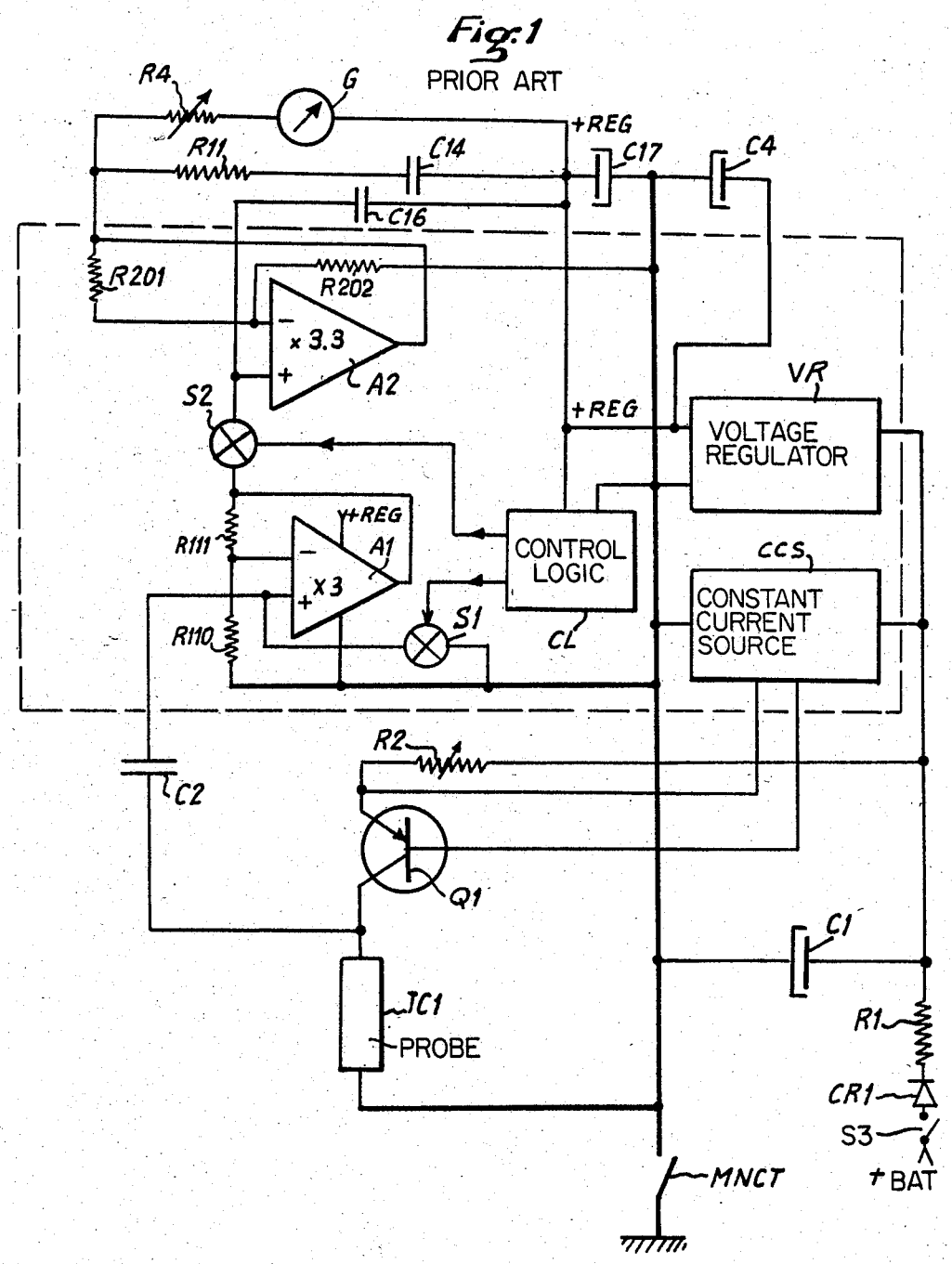

United States Patent [19]

Weiss

[11] Patent Number: 4,584,554

[45] Date of Patent: Apr. 22, 1986

[54] ENGINE OIL LEVEL DETECTING DEVICE

[75] Inventor: Mario A. Weiss, Paris, France

[73] Assignee: Jaeger, Levallois-Perret, France

[21] Appl. No.: 464,724

[22] Filed: Feb. 7, 1983

[30] Foreign Application Priority Data

Feb. 19, 1982 [FR] France .................. 82 02773

[51] Int. Cl.$^4$ .............................. B60Q 1/00
[52] U.S. Cl. ...................... 340/59; 340/620
[58] Field of Search ............. 340/59, 618, 620, 622, 340/627; 73/295, 304 R

[56] References Cited

U.S. PATENT DOCUMENTS

| | | | |
|---|---|---|---|
| 3,626,400 | 12/1971 | Bates | 340/622 |
| 4,023,137 | 5/1977 | Olsho et al. | 340/59 |
| 4,163,391 | 8/1979 | Bezard et al. | 340/59 |
| 4,306,525 | 12/1981 | Faxvog | 123/196 |
| 4,356,480 | 10/1982 | Dressler | 340/59 |
| 4,385,290 | 5/1983 | Fiala | 340/59 |

FOREIGN PATENT DOCUMENTS

| | | |
|---|---|---|
| 2308370 | 9/1970 | Fed. Rep. of Germany . |
| 2904145 | 8/1980 | Fed. Rep. of Germany . |
| 2216437 | 8/1974 | France . |
| 2457480 | 12/1980 | France . |
| 1454794 | 3/1976 | United Kingdom . |

Primary Examiner—John W. Caldwell, Sr.
Assistant Examiner—Tyrone Queen
Attorney, Agent, or Firm—Quarles & Brady

[57] ABSTRACT

A device for measuring the oil level in the sump of an internal combustion engine. A resistive wire probe extends into the oil contained in the sump. The voltage across the terminals of the probe will vary according to the immersion of the probe in the oil and such voltage is transmitted to a galvanometer in the form of an oil level gauge for indicating the level of the oil to the driver. In order to prevent termination of the signal to the oil level gauge when the engine is started and pumps the oil out of the sump, a timer circuit is provided to continue the signal to the oil level gauge for a predetermined period of time after the ignition switch is closed.

8 Claims, 2 Drawing Figures

ENGINE OIL LEVEL DETECTING DEVICE

This invention relates to a device for detecting the oil level in an internal combustion engine of a vehicle.

Such a device requires a display or indicator incorporated in the dashboard of the vehicle and consequently to be excited upon the closing of the ignition contacts of the internal combustion engine in the case of an engine with electrical ignition or of the equivalent contact in the case of an engine with compression ignition.

We have already proposed devices for measuring and displaying a liquid level, in which devices the pick-off is a resistive probe immersed in the liquid as disclosed in U.S. Pat. No. 163,391. These devices may be used for oil level measuring and display. We have observed, however, that in the particular case of measuring the oil level in a motor-car engine, the measurement can only be taken during a limited time before the engine is started. Indeed, as soon as the engine is running, the oil is drawn in by the oil pump and distributed towards the various parts of the engine which require lubrication and very soon practically no more oil remains at the bottom of the sump.

In order to overcome this, it is known to use a closed contact of the oil pressure switch to feed the measuring circuit of the oil level detecting device. Thus the user switches on the ignition, then observes the amount of oil present at rest in his sump, then he starts his engine. Said contact of the oil pressure switch opens shortly afterwards, so that the measuring circuit of the oil level detecting device is no longer fed and the corresponding level indication disappears. This system has however a major disadvantage. If the user is in a hurry, he risks not being warned of a lack of oil in the sump of the engine because he starts his engine too quickly.

In accordance with this invention, there is provided a device for detecting the oil level in an internal combustion engine of a vehicle, said device comprising a resistive probe, a display device, a measuring and storage arrangement connected between the probe and the display, and means for feeding this arrangement following closure of an ignition contact, a sub-circuit being connected between a ground point and said ignition contact and arranged to establish a temporary ground connection for said measuring and storage arrangement, after the closing of said ignition contact.

A suitable adjustment of the time of operation of this latter sub-circuit enables the oil level measurement to be effected and displayed in an optimum manner. Indeed, it has been found that the measurement can be acquired, and then stored, most of the time before the oil level has been disturbed by the operation of the engine. Later sufficient time remains to display the measured value thus stored, and consequently to warn a user in a hurry of the fact that his oil level is inadequate.

Figure 2:
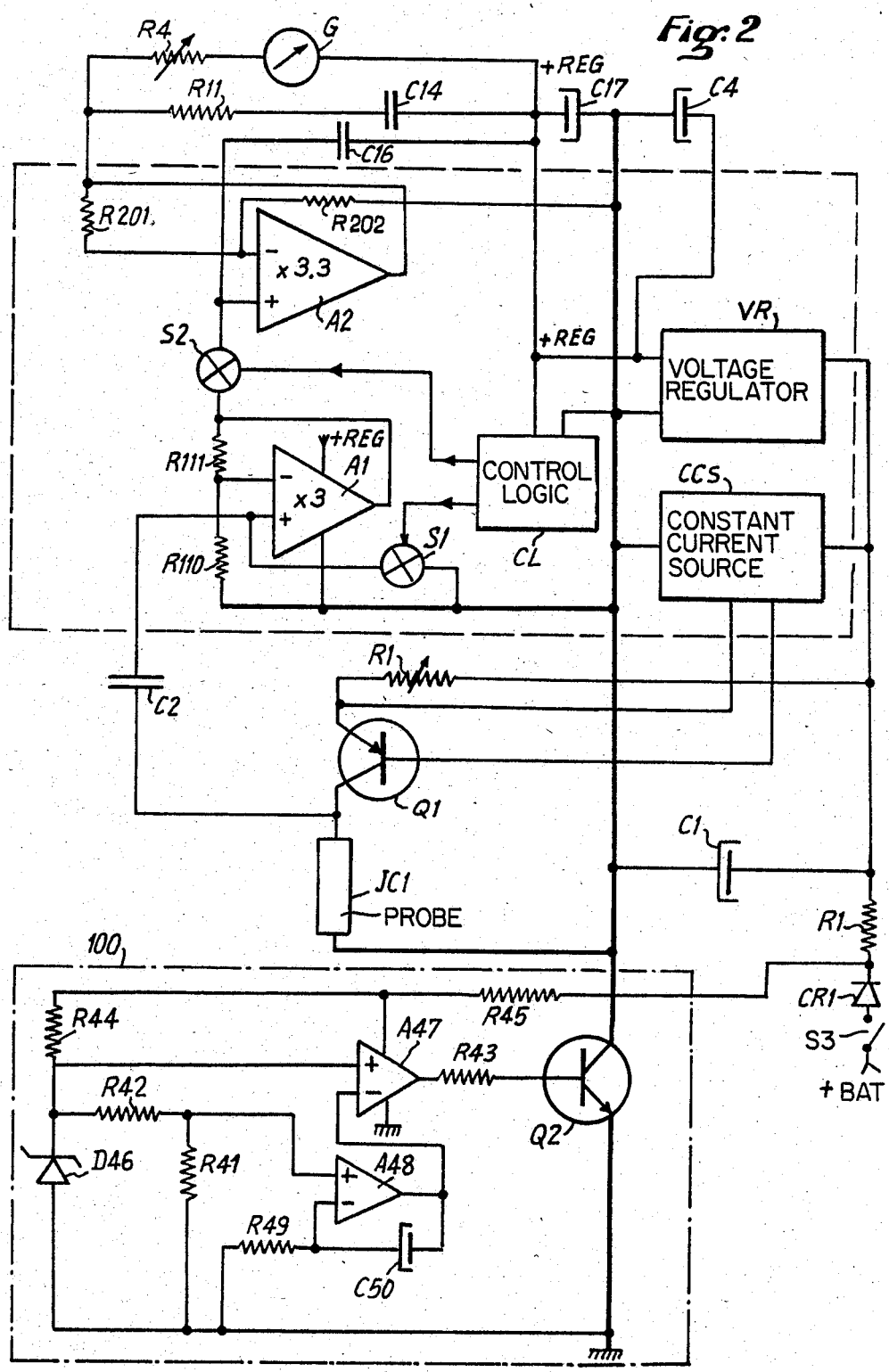

An embodiment of this invention will now be described, by way of example only, with reference to the accompanying drawings, in which:

FIG. 1 is a circuit diagram of a prior art device for detecting the oil level; and FIG. 2 is a circuit diagram of an oil level detecting device in accordance with the present invention.

The parts which are common to FIGS. 1 and 2 will first be described. A thermo-resistive probe JC1 is more or less immersed in the oil, depending on the level of the oil. The voltage available at the output of the usual ignition contact switch is denoted +BAT and is applied, in series, to a diode CR1 followed by a resistor R1. The other end of the resistor R1 is connected to one terminal of an electrochemical capacitor C1, the other termianl of which goes to a large earth or ground connection, illustrated in thick lines. According to the prior art device (FIG. 1), this connection is only effectively connected to the body of the vehicle when an oil pressure switch MNCT is closed, that is to say when the oil pressure is not established.

The feed voltage thus filtered by the elements CR1, R1 and C1 is applied to a circuit forming a constant current source CCS, and to a voltage regulator VR which delivers a regulated voltage+REG positive in relation to earth. The same filtered feed voltage is applied, through an adjustable resistor R2, to the emitter of a PNP transistor Q1, the collector of which is connected to the thermo-resistive probe JC1.

The constant current delivered by the source CCS is applied between the base and the emitter of the transistor Q1 to cause a constant current to be fed through thermo-resistive probe JC1.

The rest of the elements in the Figure are fed from the regulated voltage+REG supplied by the voltage regulator VR. These other elements comprise a control logic CL, capable of defining two states consecutively, which correspond first to the closing of the switch S1, while the switch S2 is open and then conversely to the opening of the switch S1, while the switch S2 is briefly closed.

An operational amplifier A1, having a gain equal to 3 for example, is equipped with a resistor R111 between its output and its inverting input and with a resistor R110 between this inverting input and earth, while its non-inverting input is connected on the one hand to a capacitor C2, the other plate of which goes to the probe JC1 (at the side of the collector of the transistor Q1) and on the other hand to earth through the switch S1.

Through the other switch S2, the output of the amplifier A1 is connected to the non-inverting input of a differential amplifier A2. The inverting input of amplifier A2 is connected on the one hand to the output through a resistor R201 and on the other hand to earth through a resistor R202 which gives amplifier A2 a gain of 3.3 for example. The output of A2 goes to one end of a visual display, here consisting of a galvanometric device G in series with a resistor R4, this series arrangement being in parallel with a compensator formed by a resistor R11 and a capacitor C14 in series. Finally, it will be noted that the non-inverting input of the amplifier A2 is connected, through a capacitor C16 forming a store for the oil level measurement, to the positive line+REG. Finally, one or more capacitors C4 and C17 are provided between the earth line in thick lines and the+REG voltage line already mentioned.

The operation of the circuit of FIG. 1 is as follows. On energizing, by application of the voltage+BAT upon the closing of the ignition switch S3 of the vehicle, switch MNCT being closed at this time, the control logic CL comes into its first state which closes the switch S1 and opens the switch S2. The constant current source excites the probe through the transistor Q1 with the effect of charging the capacitor C2.

At the end of a predetermined time, sufficient to ensure a charge on the capacitor C2 representing the initial voltage $V_o$ across the terminals of the probe, the control logic changes state, S1 now becoming open and S2 closed.

As already described in French Pat. No. 4,163,391 the probe voltage will then develop according to the extent to which the probe JC1 is immersed in the oil (and therefore according to the level of oil). Thus, the constant current flowing through the probe causes it to heat up by an amount dependent upon the heat exchange between the probe and the oil, and this depends upon the extent of immersion: the probe has a resistance dependent upon its temperature and the voltage (now $V_1$) developed across it depends upon its degree of immersion and therefore the temperature which it reaches after a preset time. This variable probe voltage $U_1$ is now in opposition to the voltage $U_o$ stored at the terminals of the capacitor C2 and the difference $U_1-U_o$ is applied to the amplifier A1, the output of which is proportional to $U_1-U_o$. At the end of a second predetermined time, the switch S2 closes briefly and the value of the voltage $U_1-U_o$ is thus stored in the capacitor 16. As described in the above mentioned patent this voltage $U_1-U_o$ is representative of the level of the liquid. Other systems of obtaining a signal representative of the level of the liquid, which systems can likewise be used here, are described in patent application Ser. No. 424,442 filed Sept. 27, 1982.

With the response time peculiar to this type of device the galvanometric device G will then provide a visual indication of the oil level, depending on the magnitude $U_1-U_o$ stored in the capacitor 16 (or of a representative magnitude otherwise derived).

As previously mentioned, everything takes place normally if the user is patient and allows the oil level detecting device time to detect and display the oil level before starting the engine. In the opposite case, if the starting of the engine is effected very rapidly, the oil pressure also rises very quickly and opens the oil pressure switch MNCT so that the feed of the circuit is no longer effected, preventing detection and display of the oil level.

Incidentally, it will be noted that the parts of FIGS. 1 and 2 which are framed by a long broken line can be made in the form of a hybrid or monolithic integrated circuit. In order to avoid any disturbance of a fresh measurement by a former measurement which has not been completed, such an integrated circuit naturally comprises means for discharging the capacitor C2 as soon as its feed disappears. It will therefore be seen that there is no means of recovering the indication of the oil level for a user in a hurry who will realize later that he has not had this important indication.

The circuit illustrated in FIG. 2 enables this disadvantage to be overcome. The earth or ground line in thick lines is here no longer connected to earth through the oil pressure switch but through the collector-emitter path of a transistor Q2. The voltage available after the diode CR1 is applied through a resistor R45 to the whole of a control sub-circuit for the transistor Q2 designated as a whole by the reference numeral 100. After the resistor R45, this sub-circuit first comprises a resistor R44 in series with a Zener diode D46. The common point of these two elements is connected on the one hand to the non-inverting input of an amplifier A47 (forming a comparator) and on the other hand to a voltage divider towards earth consisting of the two resistors R42 and R41, the common point of these two resistors being in turn connected to the non-inverting input of another differential amplifier A48. The latter is connected as an integrator or ramp generator with a capacitor C50 between its output and its inverting input, the latter being moreover connected to earth through a resistor R49. Finally, the output of the amplifier A48 is connected to the inverting input of the amplifier A47, the output of which controls the base of the transistor Q2 through the resistor R43.

The operation of the sub-circuit 100 will now be described. The voltage at the terminals of the Zener diode D46 forms a reference voltage input to the amplifier A47. At the same time, this voltage, reduced by the divider R42-R41, will start the charging of the capacitor C50 at the terminals of the integrating amplifier A48, the output voltage of which will therefore rise progressively. When the output voltage from amplifier A48, at the inverting input of the amplifier A47, reaches the reference voltage defined by the Zener diode D46 at its other input, then the base of the transistor Q2 receives a very low potential and this transistor becomes blocked.

In other words, on the closing of the ignition switch S3, the voltage +BAT is applied to the sub-circuit 100, the transistor Q2 of which will be conducting for a time defined by the integrating or timing function of sub-circuit 100 after which the transitor Q2 returns to a normal non-conducting state.

With the oil level detecting device of FIG. 2, it has proved possible to adjust the time constant defined by the sub-circuit 100 in such a manner as to obtain at reliable indication of the oil level, even for a user in a hurry. The important advantages which result from this are easily understood.

I claim:

1. A device for measuring the oil level in an internal combustion engine of a vehicle that includes an ignition switch for opening and closing an ignition contact, said device comprising a resistive wire probe at least partially immersed in said oil, a display device, a measuring and storage circuit connected between the wire probe and the display device, and circuit means for feeding such measuring and storage circuit following closure of the ignition contact, said circuit means comprising sub-circuit means connected between a ground point and said ignition contact and operable to establish a temporary ground connection for said measuring and storage circuit, after the closing of said ignition contact during a period of time after the operation of the engine has been initiated and sufficient to allow the driver to read the oil level on said display device.

2. A device as claimed in claim 1, in which said sub-circuit comprises a transistor with its collector-emitter path connected between an earth line of said measuring and storage circuit and said ground point, a ramp generator and a comparator which is arranged to render the transistor conducting so long as the output of said ramp generator is below a predetermined threshold.

3. A device as claimed in claim 1 in which said sub-circuit comprises a controlled switch in the form of a transistor and a time delay circuit which induces the conduction of the transistor from the closing of said ignition contact during a period of time independent of the operation of the engine and sufficient to allow the driver to read the oil level on said display device.

4. In a device for measuring the oil level in an internal combustion engine of a vehicle which includes an ignition switch for opening and closing an engine ignition contact, comprising: a temperature responsive resistive wire probe at least partially immersed in said oil, a measuring and storage circuit including a power supply for applying electrical energy to said resistive wire probe, means for detecting an electrical parameter in said resistive wire probe, means for memorizing an initial value of said electrical parameter when electrical energy is applied to said resistive wire probe, means for monitoring any variation in said electrical parameter from its initial value and for generating a differential parameter representative of the variation in said electrical parameter at a predetermined time after applying of said electrical energy to said resistive wire probe by said power supply, said differential parameter being representative of the oil level, a display device for displaying said differential parameter, the improvement comprising sub-circuit means connected between a ground point and said ignition contact, for establishing a temporary ground connection for said measuring and storage circuit, and as a consequence for said resistive wire probe and said display device, after the closing of said ignition contact for a period of time subsequent to said predetermined time, after the operation of the engine has been initiated and sufficient to allow the vehicle operator to read the oil level on said display device.

5. A device as claimed in claim 4 in which said electrical parameter is the voltage across said resistive wire probe.

6. A device as claimed in claim 4 wherein said power supply is a constant current type power supply and the electrical parameter detected is the voltage across said resistive wire probe.

7. A device as claimed in claim 4 in which said sub-circuit means includes a controlled switch in the form of a transistor and a time delay circuit which induces the conduction of the transistor from the closing of said ignition contact for a period of time independent of the operation of the engine and sufficient to allow the driver to read the oil level on said display device.

8. A device as claimed in claim 4 in which said subcircuit comprises a transistor, a ramp generator and a comparator said transistor having a collector-emitter path connected between an earth line and said ground point, the comparator being connected to receive the output of said ramp generator and compare it with a reference value, the output of said comparator being connected to the base of said transistor to render it conductive whenever the output of said ramp generator is below a predetermined threshold.

* * * * *

UNITED STATES PATENT AND TRADEMARK OFFICE
CERTIFICATE OF CORRECTION

PATENT NO. : 4,584,554

DATED : April 22, 1986

INVENTOR(S) : Mario A. Weiss

It is certified that error appears in the above-identified patent and that said Letters Patent is hereby corrected as shown below:

Column 1, line 15, "No. 163,391" should be --No. 4,163,391--.

Column 3, line 1, "French" should be --United States--.

Signed and Sealed this

Fifteenth Day of July 1986

[SEAL]

Attest:

DONALD J. QUIGG

Attesting Officer

Commissioner of Patents and Trademarks